United States Patent [19]
Leining et al.

[11] Patent Number: 6,027,405
[45] Date of Patent: Feb. 22, 2000

[54] CARCASS SPLITTING APPARATUS

[75] Inventors: Lyndon R. Leining, Austin, Minn.;
Lawrence D. Boody, Oliver Springs, Tenn.

[73] Assignee: Hormel Foods, LLC, Austin, Minn.

[21] Appl. No.: 09/191,570

[22] Filed: Nov. 13, 1998

[51] Int. Cl.[7] .................................................. A22B 5/20
[52] U.S. Cl. ......................................... 452/160; 452/152
[58] Field of Search ..................................... 452/160, 152

[56] References Cited

U.S. PATENT DOCUMENTS

| | | |
|---|---|---|
| 3,916,482 | 11/1975 | Kvilhaug . |
| 4,507,822 | 4/1985 | Herubel . |
| 4,562,388 | 12/1985 | Wolf ........................................ 318/301 |
| 4,562,614 | 1/1986 | Gerding . |
| 4,653,150 | 3/1987 | Leining . |
| 4,667,368 | 5/1987 | Menqi . |
| 4,667,371 | 5/1987 | Vogt . |
| 4,841,602 | 6/1989 | van der Hoorn et al. . |
| 4,970,756 | 11/1990 | Durand ................................... 452/160 |
| 5,160,295 | 11/1992 | Bekkers ................................. 452/160 |
| 5,254,031 | 10/1993 | Balke ..................................... 452/149 |
| 5,421,772 | 6/1995 | Durand ................................... 452/160 |
| 5,611,727 | 3/1997 | Dufour et al. ........................... 452/153 |
| 5,613,905 | 3/1997 | Van Ochten et al. ................... 452/160 |
| 5,626,515 | 5/1997 | Krogh ..................................... 452/187 |
| 5,655,960 | 8/1997 | Van Horeebeck ...................... 452/160 |
| 5,779,533 | 7/1998 | Jacobs et al. ........................... 452/160 |

FOREIGN PATENT DOCUMENTS

| | | |
|---|---|---|
| 24 21 225 | 11/1975 | Germany . |
| 3319261 | 11/1984 | Germany ............................... 452/160 |

*Primary Examiner*—Willis Little
*Attorney, Agent, or Firm*—Mau & Krull, P.A.

[57] ABSTRACT

A carcass splitting apparatus 10 splits the carcass of an animal suspended by a suspension mechanism from an overhead conveyor. The apparatus includes a frame and a carriage assembly for moving along the frame. A drive mechanism moves the carriage along the frame and a saw is connected to the carriage for general vertical movement to split the carcass. A suspension member pusher is connected to the assembly for controlling movement of the carcass independent of the overhead conveyor. The apparatus includes a plurality of hydraulic cylinders and transducers to monitor the locations of the various components of the carcass splitting apparatus.

12 Claims, 14 Drawing Sheets

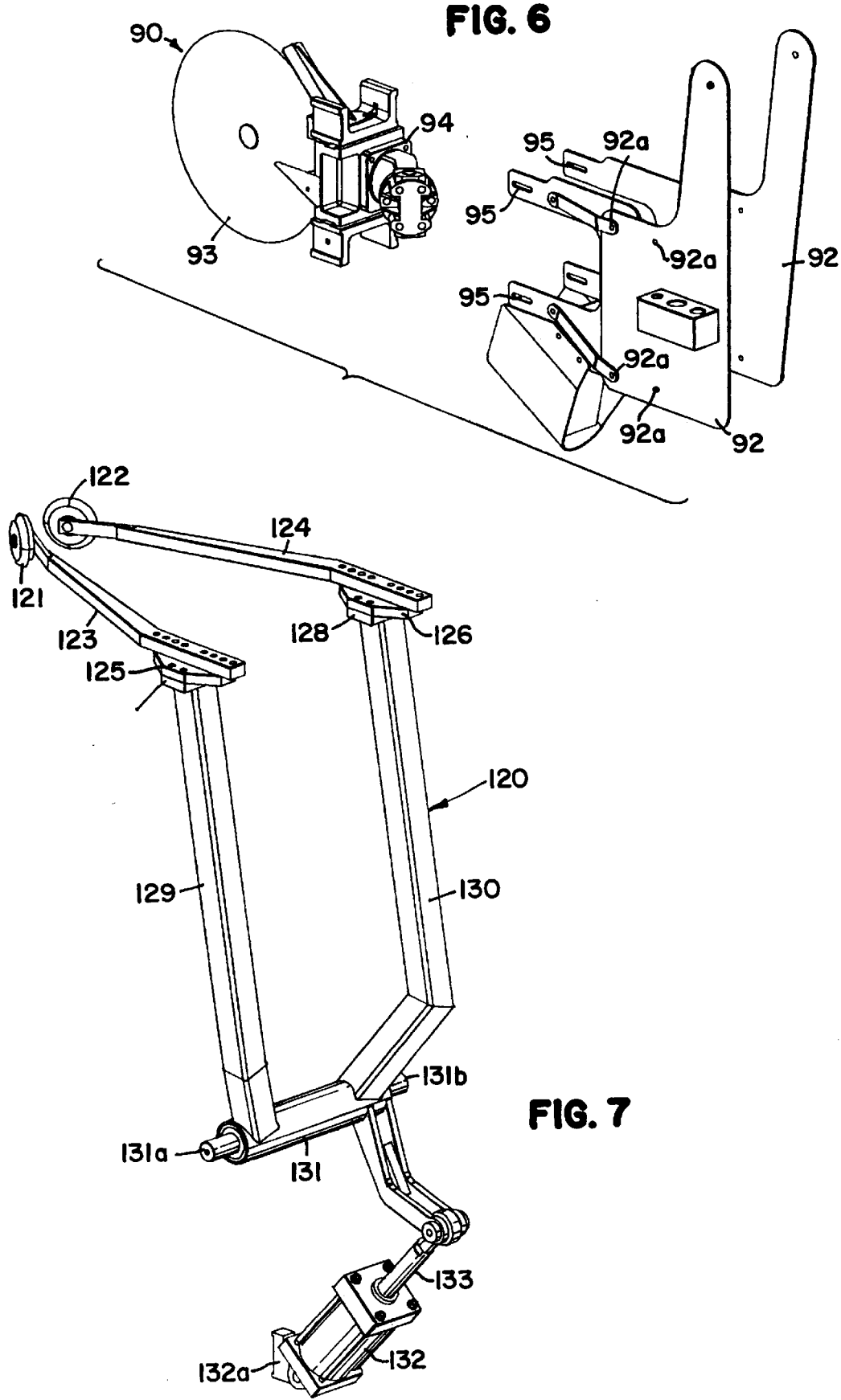

CARCASS SPLITTING APPARATUS

BACKGROUND OF THE INVENTION

1. Field of the Invention

This invention relates generally to an apparatus for splitting an animal carcass into nearly equal halves along the backbone, and more particularly to a carcass splitting apparatus which controls the movement of the hog carcass as it is being split while using a plurality of transducers and hydraulic cylinders to monitor movement of the components of the apparatus.

2. Description of the Prior Art

In commercial meat packing operations, animals, such as hogs, are slaughtered, bled, skinned, eviscerated, and the carcass is then cut into halves before it is chilled. The carcasses are suspended from an overhead rail and moved by a conveyor on the rail and the workers make a vertical cut through the carcass along the backbone with a power driven saw. The vertical cut is made by the worker as the hog carcass is moved by the overhead conveyor. This type of carcass splitting procedure is both dangerous and labor intensive.

U.S. Pat. No. 4,653,150 discloses a carcass splitting apparatus which mechanically splits the carcass. The apparatus is tied to the movement of the overhead conveyor and therefore is subject to the variations in speed which may take place in a large overhead conveying system. Still further the components of the apparatus are moved in and out horizontally, requiring a larger mass to be moved.

The present invention addresses the problems associated with the prior art devices and provides for a carcass splitter which controls the movement of the animal carcass as it is being split, thereby increasing the control over the carcass. In addition, the present invention provides for an apparatus which pivotally moves a number of the components to more accurately and more easily track the motion of the components which utilize hydraulic cylinders having transducers attached thereto.

SUMMARY OF THE INVENTION

The present invention is an apparatus for splitting an animal carcass longitudinally through the backbone thereof, such as a hog carcass, as the carcass is suspended by a suspension mechanism from a rail on an overhead conveyor. The suspension mechanism is movable on the rail and driven by the conveyor. The apparatus includes a frame having a longitudinal axis generally parallel to the overhead conveyor. A carriage assembly is movable along the longitudinal axis of the frame. A drive mechanism is provided for moving the carriage assembly along the frame. A saw is operatively connected to the carriage for generally vertical movement to split the carcass. A suspension member pusher is operatively connected to the carriage assembly. The pusher includes a hydraulic cylinder having an extendable rod. A probe surface is operatively connected to the rod, wherein when the probe moves from a retracted position to an extended position, the probe surface engages the suspension member and the probe surface, instead of the conveyor, controls movement along the rail as the drive mechanism moves the carriage assembly along the longitudinal axis.

In another embodiment, the invention is an apparatus for splitting an animal carcass longitudinally through the backbone thereof, such as a hog carcass, as the carcass is suspended by a suspension mechanism from a rail on an overhead conveyor. The suspension mechanism is movable on the rail and driven by the conveyor. The apparatus includes a frame having a longitudinal axis generally parallel to an overhead conveyor. A carriage assembly is movable along the longitudinal axis of the frame. The carriage has a first section on a first side of the longitudinal axis and a second section on the second side of the longitudinal axis. A first hydraulic cylinder has an extendable rod. The cylinder is operatively connected to the frame and the rod is operatively connected to the carriage assembly. A first transducer is operatively connected to the rod. A saw carriage mast is pivotally mounted to the first section of the carriage. A second hydraulic cylinder having an extendable rod is operatively connected to the frame. The rod is operatively connected to the saw carriage mast. A second transducer is operatively connected to the rod. A saw is movable vertically on the saw carriage mast. A third hydraulic cylinder has an extendable arm and the cylinder is operatively connected to the frame and the rod is operatively connected to the saw. A third transducer is operatively connected to the rod, wherein the position of each extendable rod is able to be monitored and more precisely controlled.

In another embodiment, the invention is a method of splitting an animal carcass longitudinally through the backbone thereof, such as a hog carcass. The method includes suspending a carcass from a suspension member. The suspension member is moveable on a rail and driven by an engaging member of the conveyor. The suspension member, while on the rail, is moved away from the engaging member. Movement of the suspension member is controlled by a carcass-splitting machine while the carcass is being split. Then, control of the suspension member is released back to the engaging member, wherein variable movement of the conveyor is eliminated by having the suspension member controlled by the carcass splitter during actual splitting of the carcass.

BRIEF DESCRIPTION OF THE DRAWINGS

FIG. 6 is an exploded perspective view of the saw assembly and mount of the apparatus shown in FIG. 1;

FIG. 7 is a perspective view of the spine centering arm assembly of the apparatus shown in FIG. 1;

DETAILED DESCRIPTION OF THE PREFERRED EMBODIMENT

Figure 10:
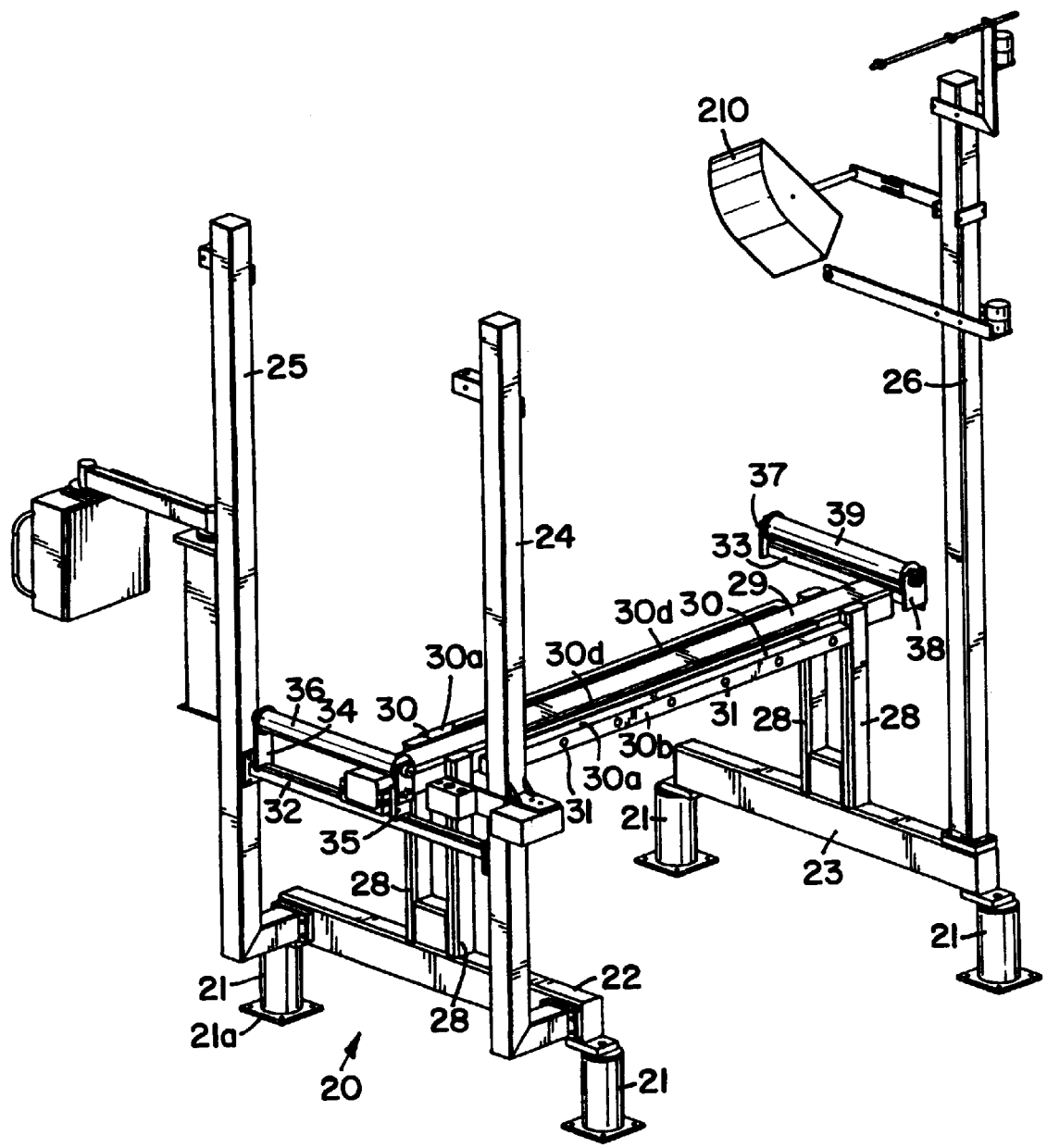
FIG. 10 is a perspective view of the frame assembly of the apparatus shown in FIG. 1.

Referring to the drawings, wherein like numerals represent like parts throughout the several views, there is generally disclosed at 10 a carcass splitting apparatus. The carcass splitting apparatus includes a frame generally designated at 20 as shown in FIG. 10. The frame 20 is attached to four supports 21. The supports have abase 21a which is secured to the floor by appropriate means such as bolts. The supports 21 are used to adjust the height of the frame 20. This allows for the carcass splitting apparatus 10 to be utilized in factories which have overhead conveyors of varying height. For different height overhead conveyors, the height of the apparatus 10 is adjusted by using supports 21 of different heights. The frame 20 includes a first base member 22 that is secured by appropriate means, such as bolts, to the supports 21. A second base member 23 is secured to the other two supports 21 in a similar manner. Secured to the first base member 22 are two vertical supports 24 and 25. The vertical supports 24 and 25 are L-shaped and have their lower sections secured to the base member 22 by suitable means, such as bolts. Two upright carriage support members 28 are secured to the base member 21 by suitable means such as welding. Similarly, two additional upright carriage members 28 are secured to the second base member 23. Supported by the upright members 28 is a horizontal carriage support member 29. The member 29 is suitably attached by means such as welding. Bearing members 30 are secured to each side of the horizontal support member 29. The bearing members 30 may be secured to the support member 29 by suitable means such as bolts 31. The bearing member 30 has a bearing surface 30a which is generally horizontal. In addition to the bearing surface 30a there is also a bearing surface 30b which is generally perpendicular to 30a and a third bearing surface 30c which is parallel to 30a and perpendicular to surface 30b. These three surfaces form the bearing surfaces on which the carriage assembly will travel. Generally elongate and rectangular guards 30d are positioned on each side of the bearing member 30 proximate the horizontal support member 29 to prevent an operator's fingers from going into a pinch area. A first support bar 32 is connected between the vertical supports 24 and 25 by suitable means such as bolts. A second support bar 33 is secured to the other end of the horizontal member 29 by suitable means such as welding. Brackets 34 and 35 are secured to the support bar 32 for rotatably supporting a conveyor roller 36. Brackets 37 and 38 are secured to the support bar 33 to rotatably support a conveyor roller 39.

Figure 8:
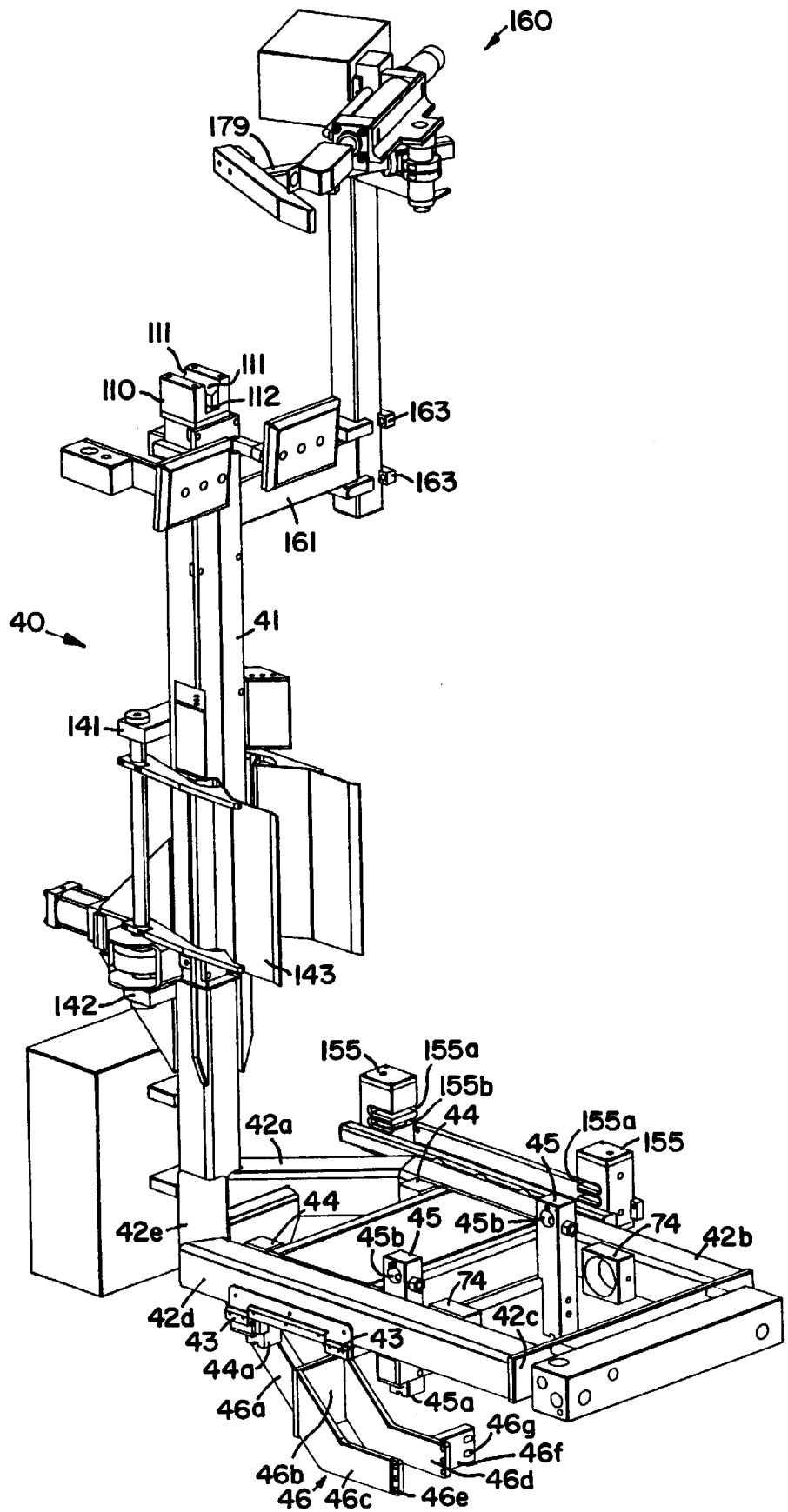
FIG. 8 is a perspective view of the carriage assembly of the apparatus shown in FIG. 1.

Slidable along the longitudinal axis of the apparatus 10, as defined by the support member 29 is a carriage assembly, generally designated at 40. The carriage assembly 40, as best seen in FIG. 8, includes a vertical mast 41 operatively connected to a lower frame 42 having members 42a through 43e. The frame members are connected by suitable means such as welding and in turn connected to the mast 41 by suitable means such as welding. Two elongate bearing members 43 are operatively connected to the bottom surfaces of the lower frame 42. The bottom of the bearing members 43 form a bearing surface which slides on the bearing surfaces 30a. Two connecting posts 44 are welded to the inside of the lower frame and to connecting posts 45 are also welded to the inside of the frame 42. The posts have bottom surfaces 44a and 45a respectively which are used to connect a bottom plate assembly to the carriage assembly, as will be discussed more fully hereafter.

Figure 9:
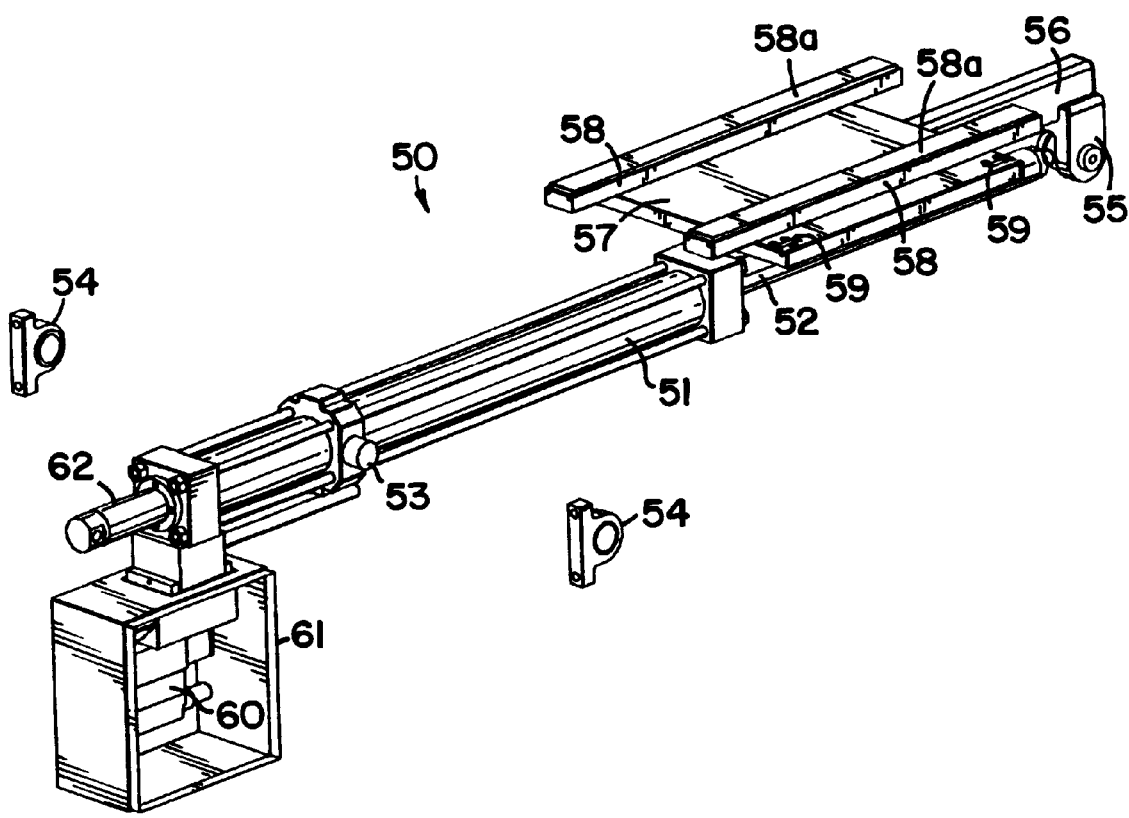
FIG. 9 is an exploded perspective view of the driving mechanism of the apparatus shown in FIG. 1.

Referring now to FIG. 9, the drive mechanism for propelling the carriage assembly 40 along the support member 29 is shown. The drive mechanism, generally designated at 50, includes a hydraulic cylinder 51 having an extendable rod 52. A mounting boss 53 is operatively connected to the cylinder 51. A similar mounting boss is provided on the far side of the cylinder, as viewed in FIG. 9, but is not shown. Two cylinder trunnion mounting blocks 54 are mounted to the upright carriage member 28 by suitable means such as bolts. This secures one end of the hydraulic cylinder 51 to the frame 20. The other end of the cylinder 51, namely the extendable rod 52, is connected to the carriage assembly 40, so that movement of the cylinder rod 52 moves the carriage assembly. The end of the extendable rod 52 is connected to a mounting block 55, which in turn has a support member 56 connected thereto by suitable means such as welding. Secured to the support member 56 is a bottom plate 57. Two bearing pad support blocks 58, having bearing pads 58a secured thereto, are positioned and secured on top of the bottom plate 57. The bearing pads 58a have a bearing surface and the bearing pads run generally longitudinal to the frame 20. The bottom plate is secured to the carriage assembly 40 by suitable means such as bolts and nuts. As viewed in FIG. 9, there are several holes 59 in the bearing plate 57. It is through these holes that the bearing plate 57 is secured. There are four sets of three holes 59 in the bottom plate 57 which are connected to the bottoms 44a and 45a of the connecting posts 44 and 45. When the bottom plate 57 is connected to the frame in such a manner, the bearing surfaces 58a are in contact with the bearing surface 30c. A servo valve 60 is operatively connected to the hydraulic cylinder 51. The servo valve 60 is mounted inside of a Hoffman box 61 for protection from the elements. A transducer 62 is operatively connected to the cylinder 51 so that the position of the extendable rod 52 can be precisely monitored as it is driven in and out by the servo valve 60. Hydraulic cylinders having a Temposonic transducer for position feedback and control are available from MTS Corporation, Minneapolis, Minn.

Figure 1:
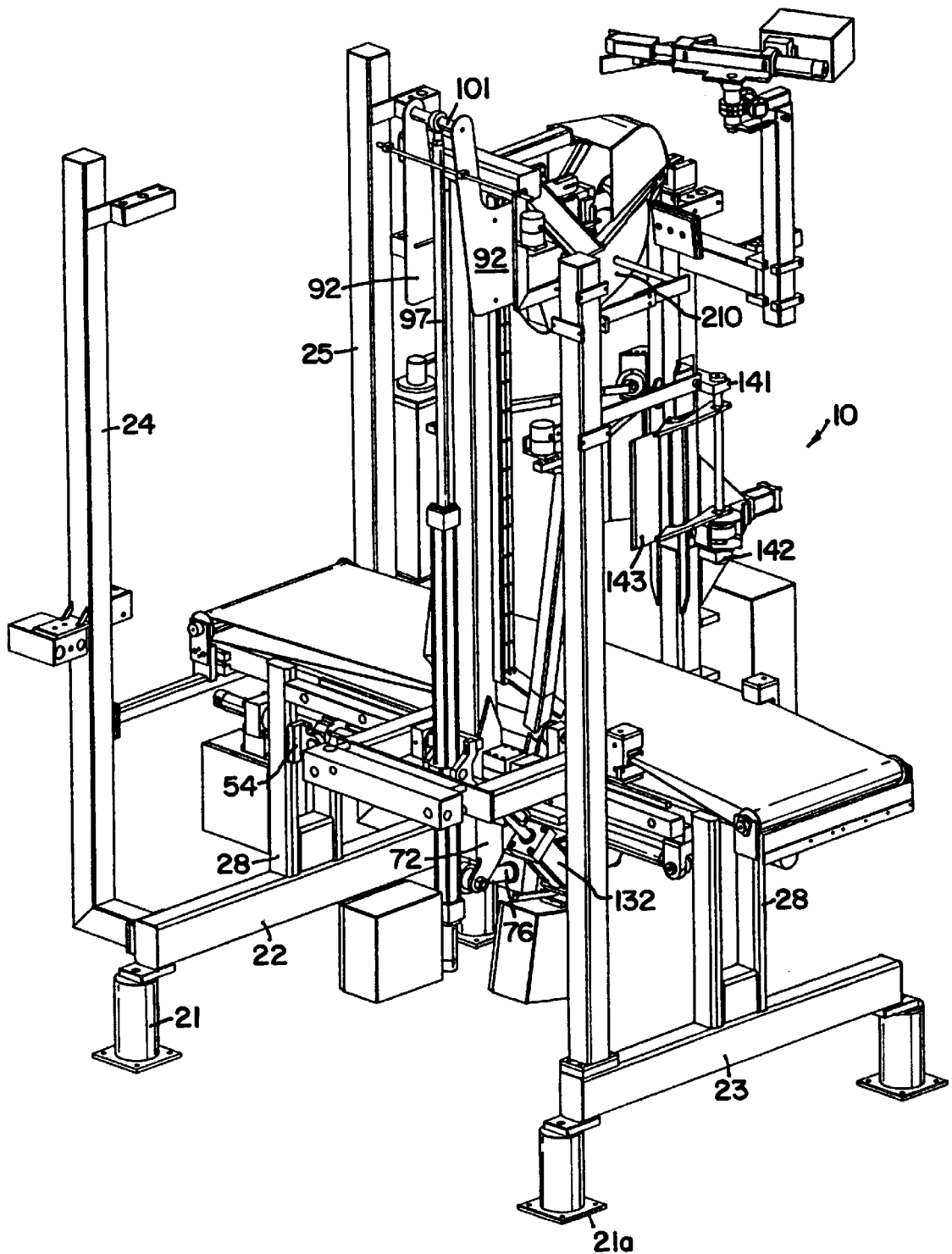
FIG. 1 is a perspective view of the carcass splitting apparatus of the present invention.
Figure 2:
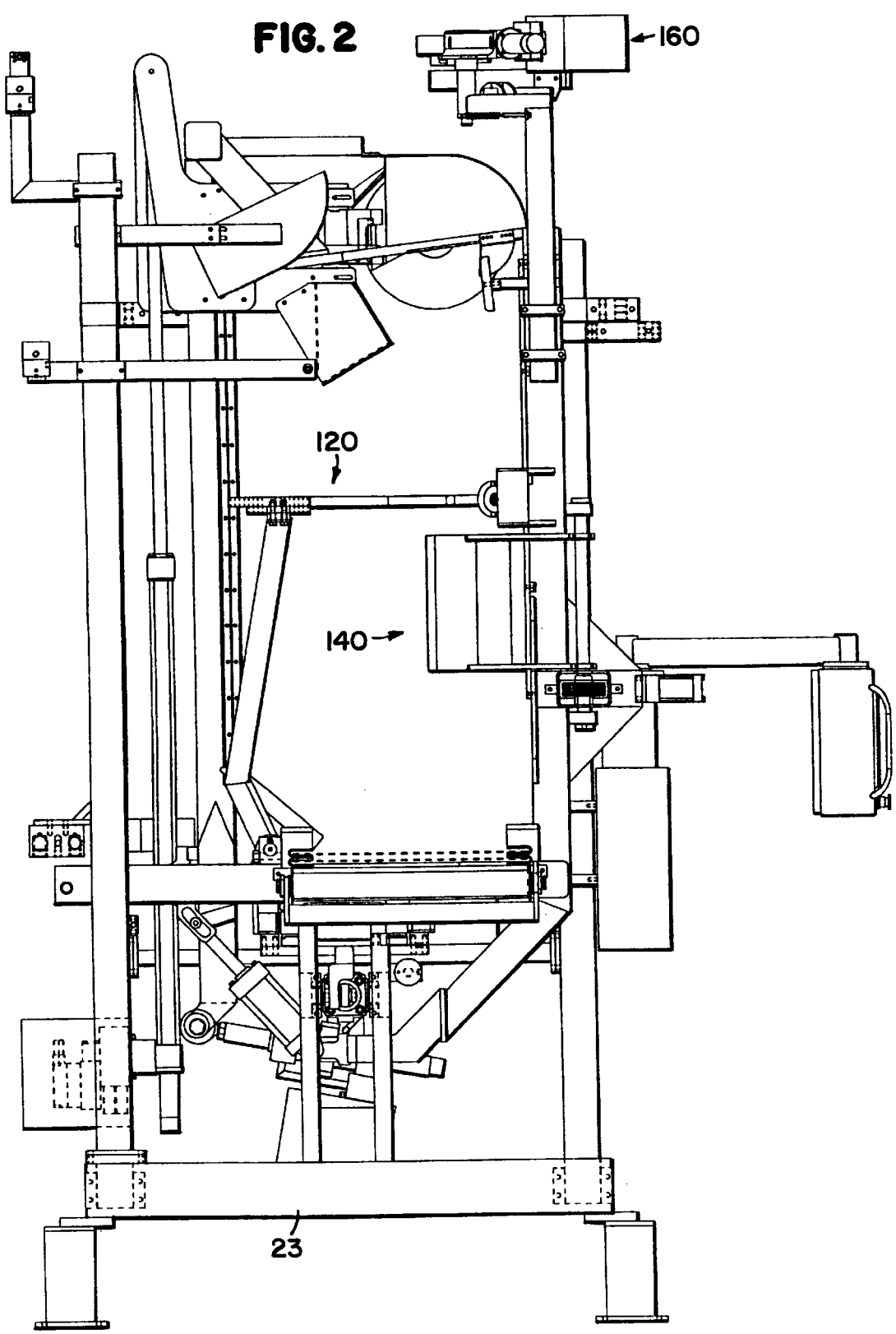
FIG. 2 is a left side elevational view of the apparatus shown in FIG. 1.
Figure 5:
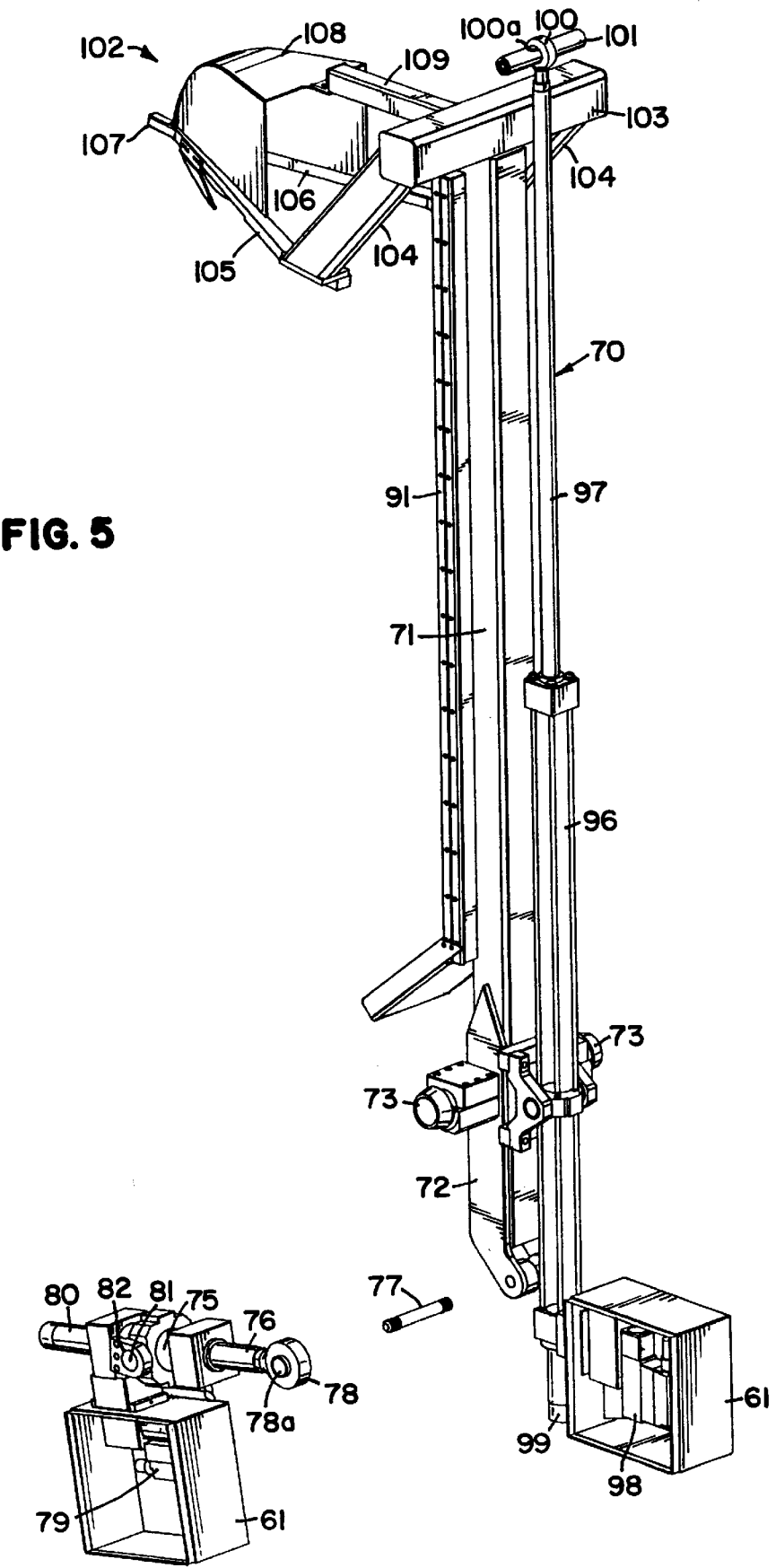
FIG. 5 is an exploded perspective view of the tilt tube assembly of the apparatus shown in FIG. 1.

Referring now to FIGS. 5 and 8, a tilt tube assembly, generally designated at 70, is mounted for pivotal movement on the carriage assembly 40. The tilt tube assembly 70 includes a mast 71 which has a yoke 72 welded at one end. Secured to the yoke, and therefore the mast 71, are two tapered bosses 73. The bosses 73 are positioned inside of tapered bearings 74 which in turn are secured by suitable means, such as welding to the lower frame 42b and 42d. The tilt tube assembly 70 is therefore free to tilt from its cutting position, as shown in FIG. 1, to a non-cutting position when the top of the mast 71 is tilted backward, when viewed in FIG. 1. Movement for the tilt tube assembly 70 is provided by a hydraulic cylinder 75 having an extendable rod 76. The extendable rod 76 is connected to the tilt tube assembly 70 by means of a tilt cylinder pin 77 which is positioned between the two segments of the yoke 72. The extendable rod 76 has a mounting member 78 which has an aperture 78a through which the tilt pin is inserted. A servo valve 79 is operatively connected to the hydraulic cylinder 75 and positioned inside of a Hoffman box 61 to protect it from the elements. A transducer 80 is operatively connected to the cylinder 75 so that the exact position of the end of the extendable rod 76 may be monitored as it is moved by the servo valve 79. The cylinder 75 has bosses 81 positioned on both sides. Mounting blocks 82 are secured to the carriage assembly 40. As shown in FIG. 8, the carriage 40 has a bottom extension 46. The bottom extension 46 has a first member 46a secured at one end by suitable means, such as welding, to the lower frame 42. The other end of the first member 46a is welded to a plate 46b, which in turn has two extension arms 46c and 46d welded thereto. At the end of the extension arm 46c and 46d are formed three apertures 46e. Mounting blocks 82 are attached by suitable means, such as bolts to the apertures 46e. An extension block 46f is welded to the extension arm 46d. Apertures 46g are formed therein and are used to secure a pneumatic cylinder 132, as will be described more fully hereafter.

Referring now to FIGS. 5 and 6, a saw head assembly, generally designated at 90, is mounted on the tilt tube assembly for movement up and down the tilt tube assembly. Two elongate tracks 91 are mounted on opposite sides of the mast 71. Two mounting plates 92 are movably attached to the tracks 91. Each mounting plate 92 has four apertures 92a formed therein. Four wheels 220 are attached by suitable means such as bearings to the inside of each mounting plate 92 at the position of the holes 92a. These four wheels contact the track 91 and roll on the track 91. The saw assembly 90 includes a saw blade 93 operatively connected to a motor 94. This assembly 90 is in turn mounted between the plates 92. Two slots 95 are provided in each mounting plate 92 which provide a point of attachment for the saw head assembly 90, by suitable means such as bolts.

The mounting plates 92 and saw head assembly 90 combination is moved up and down on the track 91 by means of a hydraulic cylinder 96. The hydraulic cylinder 96 has an extendable rod 97 that is operatively connected to a servo valve 98 which is mounted inside of a Hoffman box 61 for protection from the environment. A transducer 99 is operatively connected to the hydraulic cylinder 96 so as to be able to precisely monitor the end of the extendable rod 97. At the end of the extension rod 97 is a mounting member 100 that has an aperture 100a through which a pin 101 is positioned. The pin 101 is secured by suitable means, such as bolts, between the upper flanges of the mounting plates 92.

A plow assembly, generally designated at 102, is secured to the top of the mast 71 by suitable means such as welding. The plow assembly 102 has a connecting member 103 that is welded to the top of the mast 71. Angled generally downward are two arms 104 on each side of the connecting member 103. A generally V-shaped section is formed by a first link 105 which is connected to one of the arms 104 and a second link 106 which is connected to the other arm 104. The links 105 and 106 are joined at their other ends to form a nose section 107. Secured to the links, and generally above the links, is a three-piece shroud 108 inside which the saw head assembly 90 is positioned when it is at the top of the mast. A center arm 109 has one end connected to the shroud 108 and the other end to the connecting member 103 to further support the shroud 108. Referring now to FIG. 8, secured to the top of the mast 41 is a ham-centering socket 110. The socket 110 has a central cavity which is adapted to receive the nose section 107. The cavity is formed at the top by two angled walls 111. The purpose of the angle to the walls 111 is to guide the nose section 107 down to the lower portion of the cavity, generally designated as 112. The lower portion of the cavity 112 is sized and configured substantially the same as the nose section 107 so as to firmly locate the nose section 107, which is a mating member, in the socket 110.

Referring now to FIGS. 7 and 8, there is generally designated at 120 a spine centering arm assembly. The spine centering arm assembly 120 is pivotally mounted to the carriage assembly 40. First and second rollers 121 and 122 are rotatably mounted to arms 123 and 124 respectively. The second ends of the arms 123 and 124 are secured to mounting blocks 125 and 126 by suitable means such as bolts. The mounting blocks 125 and 126 are in turn secured to plates 127 and 128 by suitable means, such as bolts. The plates 127 and 128 are in turn secured, by suitable means such as welding, to the top of arms 129 and 130 respectively. The arms 123 and 124 form an approximately a 90° angle with the arms 129 and 130. The bottoms of the arms 129 and 130 are secured by suitable means such as welding to a cylinder 131. The cylinder 131 has shafts 131a and 131b extending in opposite directions. The shafts 131a and 131b are pivotally mounted in openings 45b between connector posts 45. Rotation of the cylinder 131 between the connecting posts 45 is controlled by a pneumatic cylinder 132 having an extendable rod 133. The pneumatic cylinder 132 is operatively connected to the frame 42. The cylinder 132 has a mounting block 132a operatively connected thereto. The mounting block 132a is secured to the apertures 43g, thereby securing the cylinder 132 to the fame 42 via the bottom extension 46.

Figure 13:
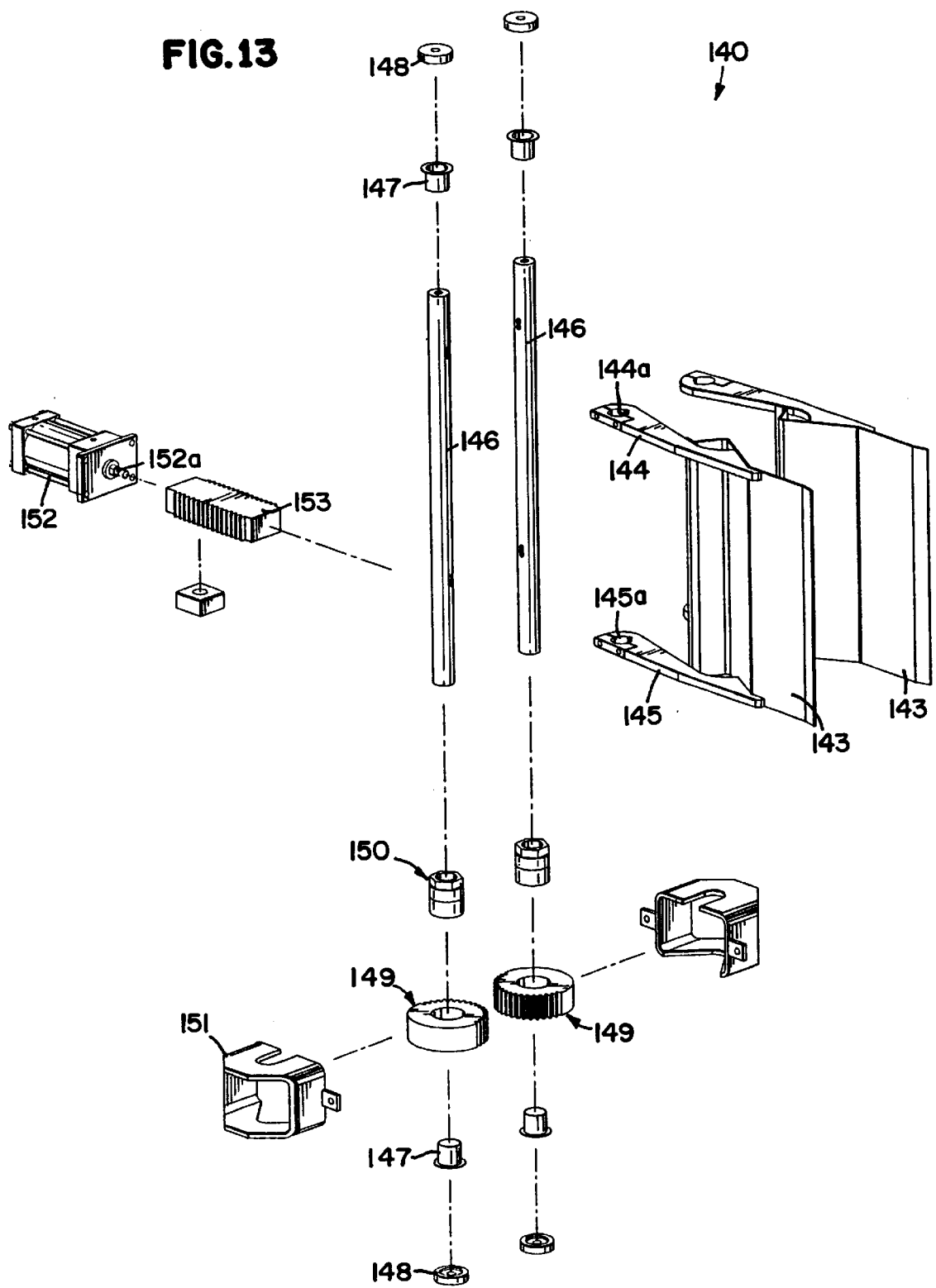
FIG. 13 is an exploded perspective view of the shoulder flap assembly of the apparatus shown in FIG. 1.
Figure 14:
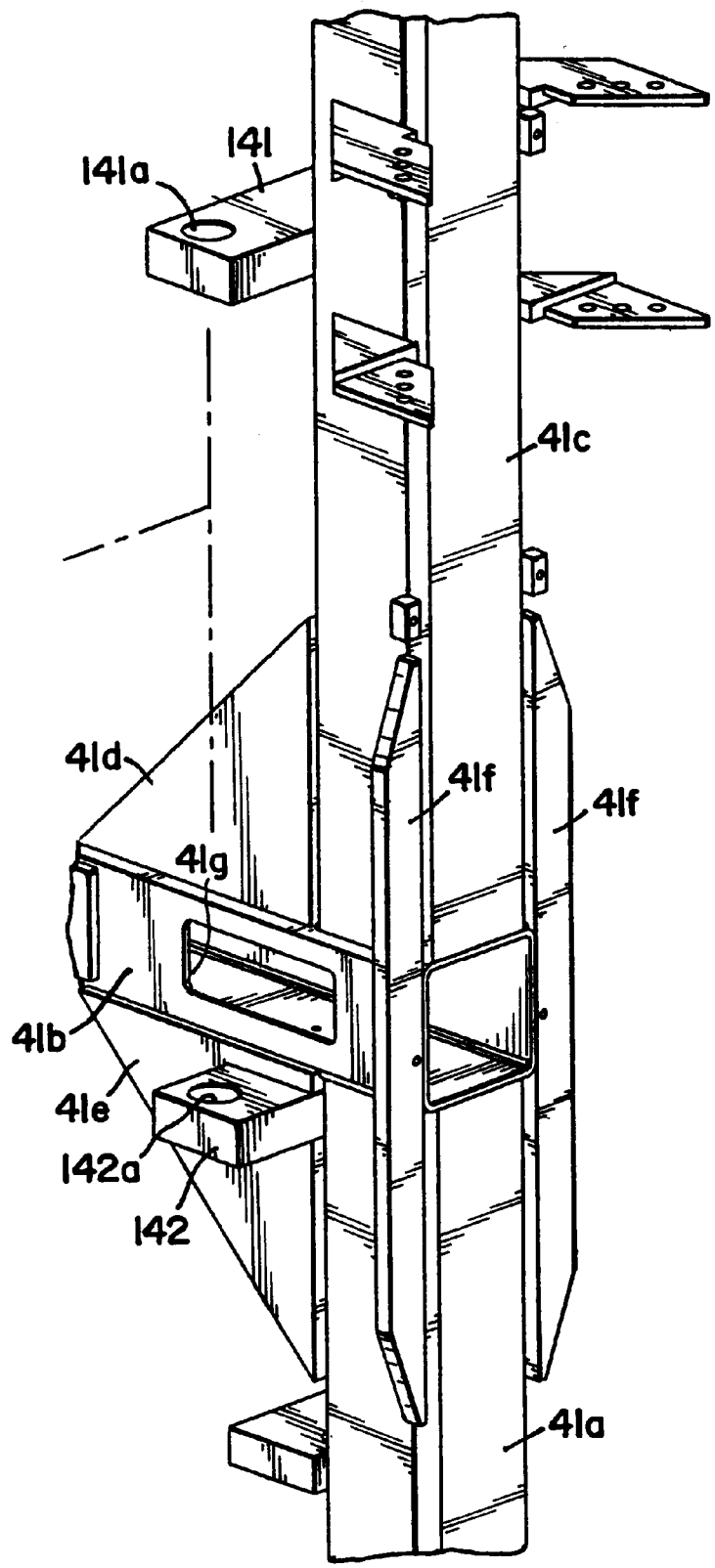
FIG. 14 is a perspective view of a portion of the vertical mast of the apparatus shown in FIG. 1.

Referring now to FIGS. 8 and 13, a shoulder flap assembly, generally designated at 140, is operatively connected to the mast 41. Referring to FIG. 14, the mast 41 is shown in an enlarged view. The mast 41 comprises a lower section 41a welded to a rectangular tube 41b which extends generally 90° to the lower portion 41a. The tube 41b has an opening 41g formed on both sides. Only one window is seen in FIG. 14. The tube 41b is in turn welded to an upper section 41c. Gussets 41d and 41e are welded to section 41b and 41c and 41a respectively. Stiffeners 41f are welded to the sections 41a and 41c to further form a solid mast 41. Still referring to FIG. 14, upper mounting block 141 is welded to the frame 41 and lower mounting block 142 is welded to the mast 41. Each mounting block 141 and 142 has a bore 141a and 142a formed therein. As will be described more fully hereafter, there are two upper mounting blocks 141 and two lower mounting blocks 142.

Referring to FIG. 13, there is shown two plates or shoulder engaging members 143. They are mounted on opposite sides of the mast 41 and are mirror images of each other, as is the method in which they are mounted. Accordingly, only one shoulder-engaging member 143 will be described in detail as well as its mounting. The shoulder-engaging member 143 has attached thereto an upper arm 144 and a lower arm 145 by suitable means such as welding. An aperture 144a and 145a is formed in each of the arms 144 and 145 respectively. The shaft 146 extends through the upper aperture 144a and the upper mounting block after 141a. It is secured in position by a bearing 147 and a thrust plate 148. The bottom of the shaft 146 extends through the lower arm aperture 145 and the lower mounting block aperture 142a. It similarly is secured by a bearing 147 and a thrust plate 148. A pinion 149 and trantorque 150 are positioned between the lower bearing 147 and are around the shaft 146. A housing 151 encloses the pinion 149. A pneumatic cylinder 152 is mounted in the housing 41b. Connected to the extendable rod 152a of the cylinder 152 is a rack 153. The rack is dual sided so as to engage pinion gears 149 for both the right and left shoulder engaging members 143 through window 41g. Therefore, as the extendable rod 152a of the pneumatic cylinder 152 moves in and out, the rack 153 is moved. The rack 153 is positioned between the pinions 149 and thereby causes both pinions and their respective shafts 146 to rotate. The upper and lower arms 144 and 145 are secured to the shafts 146 by suitable means such as bolts so that rotation of the shaft causes the shoulder engaging members 143 to rotate also.

Figure 11:
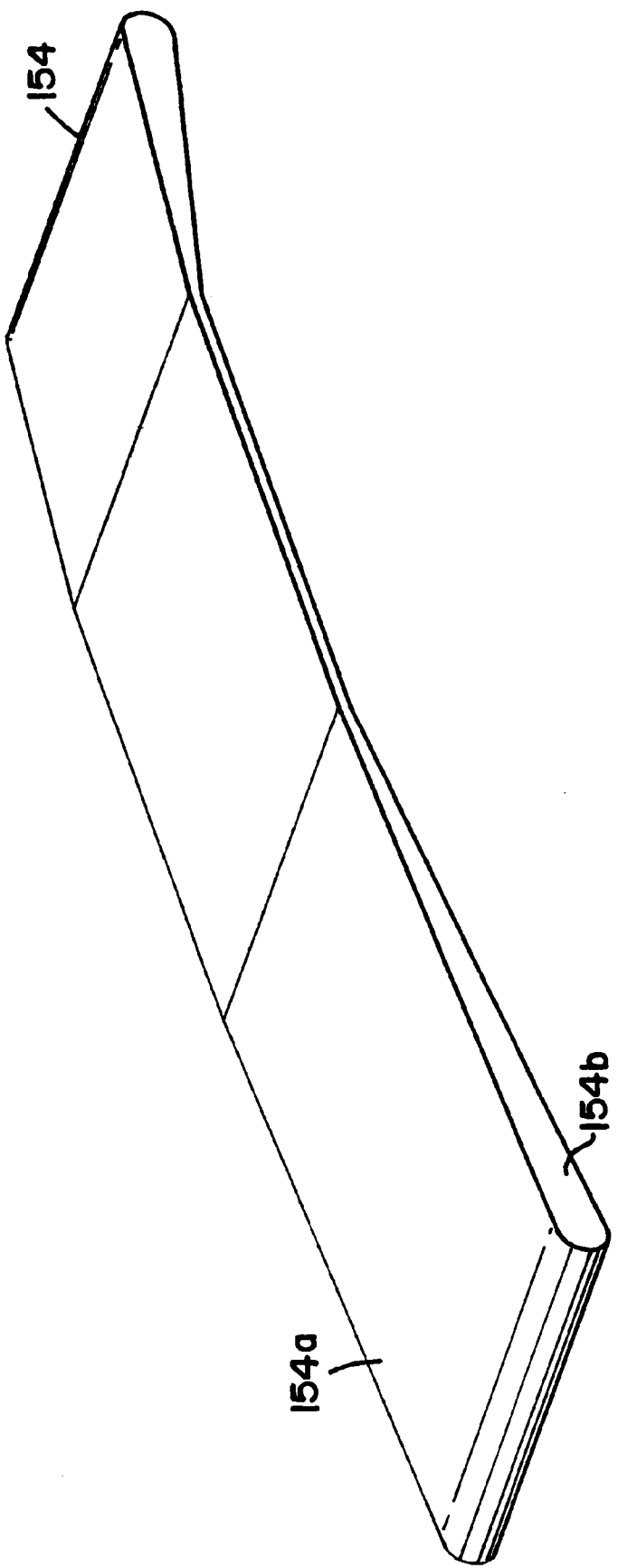
FIG. 11 is a perspective view of the belt of the apparatus shown in FIG. 1.

Referring to FIGS. 1, 8 and 11, there is shown at 154a clean-off belt. The belt has a top member 154a and a bottom member 154b. The members 154a and 154b are preferably connected to form a continuous loop belt. The belt 154 is positioned around conveyor rollers 36 and 39. Referring to FIG. 8, secured to lower frame member 42b are two pneumatically operated clamps 155. The clamps have an upper indentation 155a and a lower indentation 155b. The top member 154a is positioned inside of the two indentations 155a and the lower belt 154b is positioned in the lower indentations 155b. The clamps 155 may be actuated to close the top indentation 155a, and thereby grasp the upper belt 154a or the lower indentation 155b may be closed and thereby grasp the lower belt 154b. Rotation of the belt 154 is then accomplished by simply grasping either the top or bottom belt 154a or 154b and then, as the drive mechanism 50 moves the carriage, the conveyor belt is rotated without the necessity of having a separate drive motor.

Figure 15:
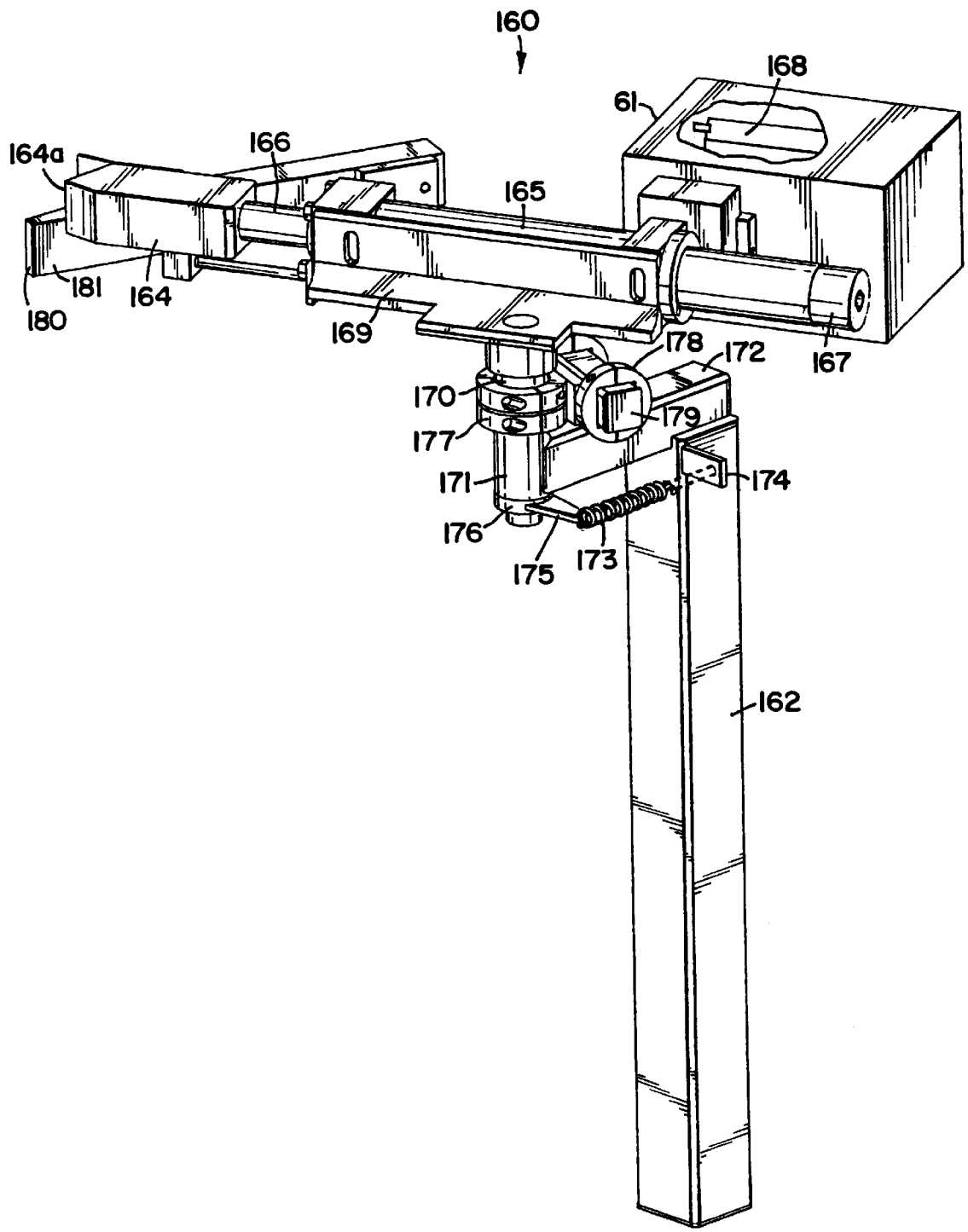
FIG. 15 is a perspective view of the trolley pusher arm assembly of the apparatus shown in FIG. 1.

Referring to FIG. 8, there is generally disclosed at 160 a trolley pusher arm assembly. The pusher arm assembly 160 is connected to the carriage assembly 40 by means of an offset arm 161 which has a first end welded to the mast 41. A support post 162 is secured to the offset arm 161 by any suitable clamps 163. Preferably, the clamps 163 allow for the support posts to be moved vertically so that the height of the pusher arm assembly may be adjusted. A trolley-engaging member or probe 164 is generally rectangular in shape. The forward end of the engaging member 164 is angled and forms a leading edge 164a. A hydraulic cylinder 165 having an extendable rod 166 which is operatively connected to the engaging member 164. The hydraulic cylinder 165 has an MTS transducer 167 operatively connected thereto so as to be able to continually monitor the exact position of the extendable rod 167. A servo valve 168 is operatively connected to and controls the operation of the hydraulic cylinder 165. The servo valve 168 is enclosed in a Hoffman box 61 for protection from the elements. The hydraulic cylinder 165 is mounted to a plate 169. The plate is in turn mounted on a rotatable shaft 170. The shaft 170 rotates within a housing 171. The housing 171 is secured to one end of a connecting member 172 which has its other end connected to the support post 162 by suitable means such as welding. A biasing force on the shaft 170 is provided by a spring 173. The spring has a first end secured to a tab 174 which is welded to the support post 162. The other end of the spring 173 is connected to a first end of a lever arm 175. The second end of the lever arm 175 is connected to a disc 176 which is in turn secured to the shaft 170. Therefore, a force on the lever arm 175, by the spring 173, biases the shaft 170 in a counterclockwise direction, as viewed in FIG. 15. A collar 177 is secured around the housing 171. Secured to the collar 177 is a yoke member 178 which has a central aperture in which a shaft 179 is secured. Secured to the other end of the shaft 179 is a urethane stop member 180. The stop member 180 has a trolley engaging surface 181. As possibly best seen in FIG. 8, when the leading edge 164a is extended a trolley, as will be described more fully hereafter, it is captured between the leading edge 164a and the trolley engaging surface 181.

Figure 12A:
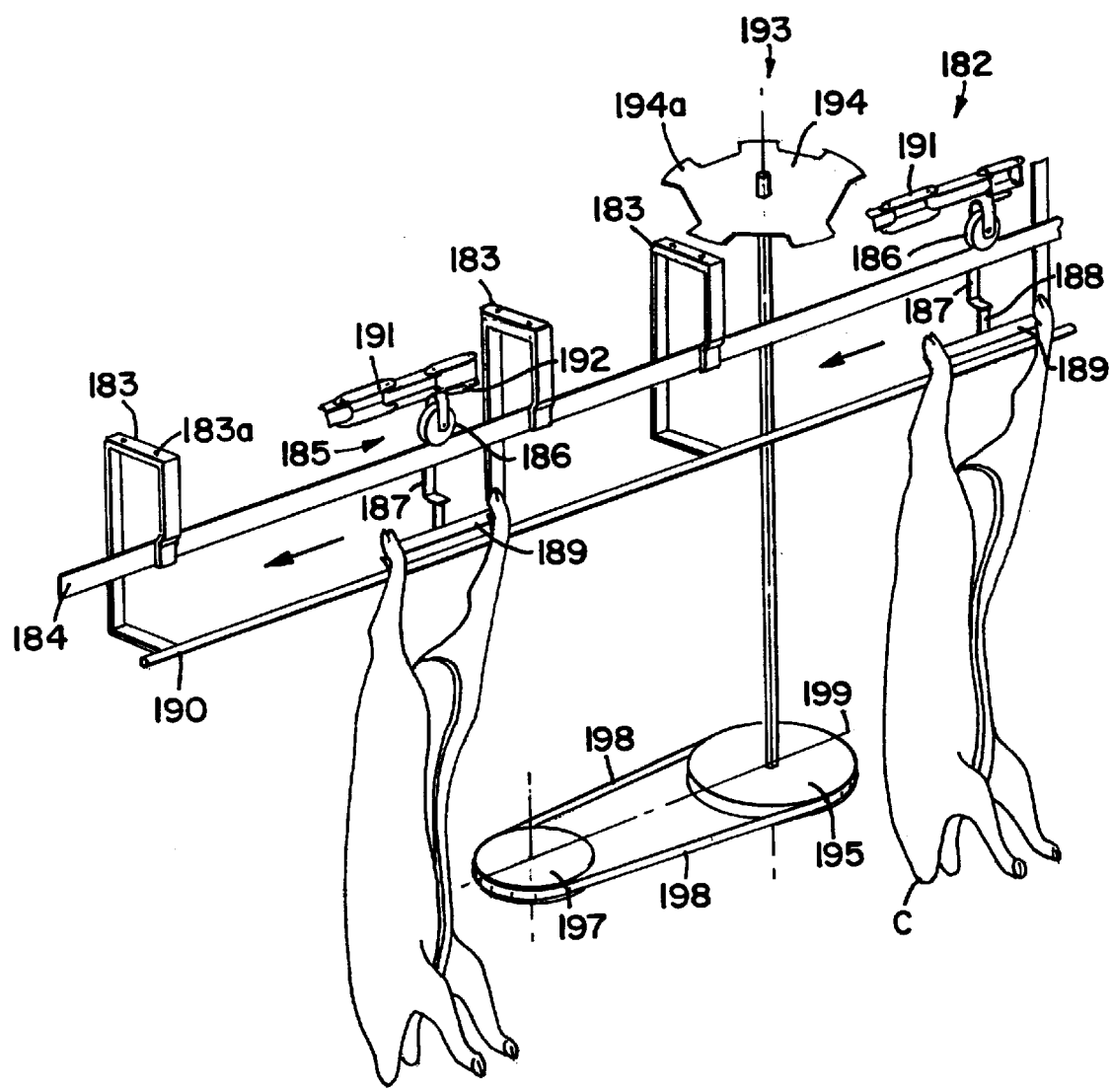
FIG. 12a is a schematic representation of a top view of a portion of the guide rail and belt shown in FIG. 12.
Figure 12B:
FIG. 12 is a perspective view of a hog suspended from a conveyor system for bringing a hog to the apparatus shown in FIG. 1.

Referring to FIG. 12, the hog carcass C is moved into position for the splitting operation by an overhead conveyor device, generally designated as 182. The overhead conveyor device 182 includes a plurality of hanger brackets 183 which are secured to a permanent structure, such as beams, ceiling or the like and which support and elongate guide rail 184. Each hog carcass C is suspended from a trolley 185. The trolley 185 includes a trolley wheel 186 that engages and moves along the guide rail 184. A trolley frame 187 is suspended from the trolley wheel 186 and is provided with a hook 188 at its lower end for engaging and supporting an elongate gambrel 189. The gambrel 189 projects through incisions in the hind feet of the hogs in a well-known manner. A guide bar 190 is secured to the hanger bracket 183 and is engaged by the hind legs of the hog during the splitting operation. A chain 191 is a continuous chain, but for clarity purposes has been shown broken away in FIG. 12. The chain 191 has a well-known guide (not shown) which mounts to the top of the brackets 183 through the holes 183a. The chain 191 runs within the guide and provides a motive force for the trolley 185. A plurality of fingers 192 project from the chain 191 and engage the trolley 185 via the trolley frame 187. Such an overhead conveying device, described so far, is well known in the art.

The direction of travel of the overhead conveyor device 182 is shown by the arrows in FIG. 12. The carcass shown on the right is being transported to the carcass splitting apparatus 10. However, the hog carcass C may be swinging or moving due to a variety of forces which may have acted on the carcass C. Shown at 193 is a restraining mechanism to prevent oscillations of the hog carcass C. The restraining mechanism 193 includes a toothed disc 194 that has a plurality of teeth 194a that engage the chain 191. The tooth disc 194 acts like a sprocket and catches the chain 191 and causes the disc 194 to rotate in a clockwise direction, as viewed in FIG. 12. Secured between the disc 194 and a pulley 195 is a shaft 196. The shaft allows for transfer of the rotation of the disc 194 to the pulley 195. An idler pulley 197 is connected via a belt 198 to the pulley 195. The belt 198 maybe any suitable belt, such as a 1-inch diameter polyurethane belt. The pulleys and shaft are secured to a floor or framework to provide stability. A longitudinal axis 199 extends between the center points of the pulleys 195 and 197.

The belt 198 is positioned so that it engages the carcass C when it is proximate the pulley 195 and then gradually angles away from the longitudinal axis of the guide bar 190 so that by the time the carcass C is proximate the end of the pulley 197 the carcass C is disengaged from the belt 198. During the travel time from the large pulley 195 to the idler pulley 197, the movement of the carcass C is steadied. Then, as will be described more fully hereafter, the carcass C is then ready to be split by the splitting apparatus 10.

Alternatively, there may be a direct drive for the pulleys 195 and 197 such as being driven either hydraulically or electrically. It would be necessary that the alternative drive provides for a speed of the belt 198 which matches the speed of the chain 191. Also, it may be advisable to have a backup plate directly behind that portion of the belt 198 that contacts the carcass between the pulleys. The purpose of the backup plate would be to prevent deforming of the belt inwardly from the weight of the carcass. Still further, it may be advisable to have another set of pulleys and belts at a location somewhat higher than the pulleys 195 and 197 shown in FIG. 12. The purpose for the additional set of pulleys and belt is to provide another point of contact with the carcass so that two belts would steady the carcass as it moved along the conveyor device 182.

In operation, the hog carcasses C are delivered to the carcass splitting apparatus 10 on the overhead conveyor 182.

As shown in FIG. 12, the trolley wheel 186, from which the hog carcass C is supported, moves along the rail 184 and its speed is controlled by the drop finger 192 on the drive chain 191. The hog carcass C may have a tendency to oscillate, which would be detrimental to the accurate splitting of the carcass. In order to remove the oscillations or movement of the hog carcass C, the hog carcass C first encounters the restraining mechanism 193. The hog carcass C strikes the belt 198 proximate the pulley 195. As shown in FIG. 12a, the belt 198 extends in front of the guide rail 190 so as to contact the hog carcass C. Then, the belt gradually moves away from the longitudinal axis of the guide rail 190 so as to disengage from the hog carcass C by the time the hog carcass C reaches the second pulley 197. Then, the hog carcass C is ready to enter the carcass splitting apparatus 10.

Figure 3:
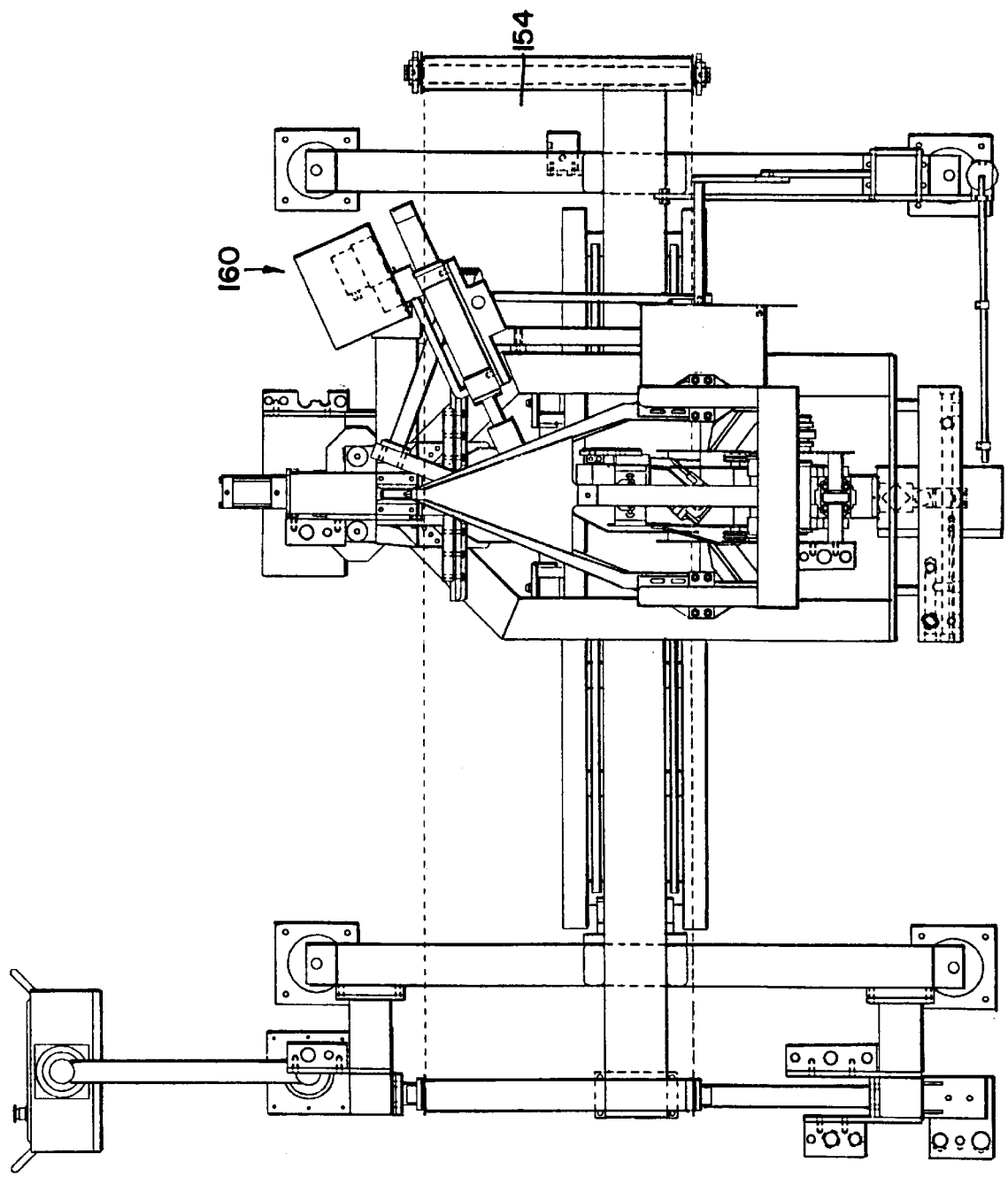
FIG. 3 is a top plan view of the apparatus shown in FIG. 1.
Figure 4:
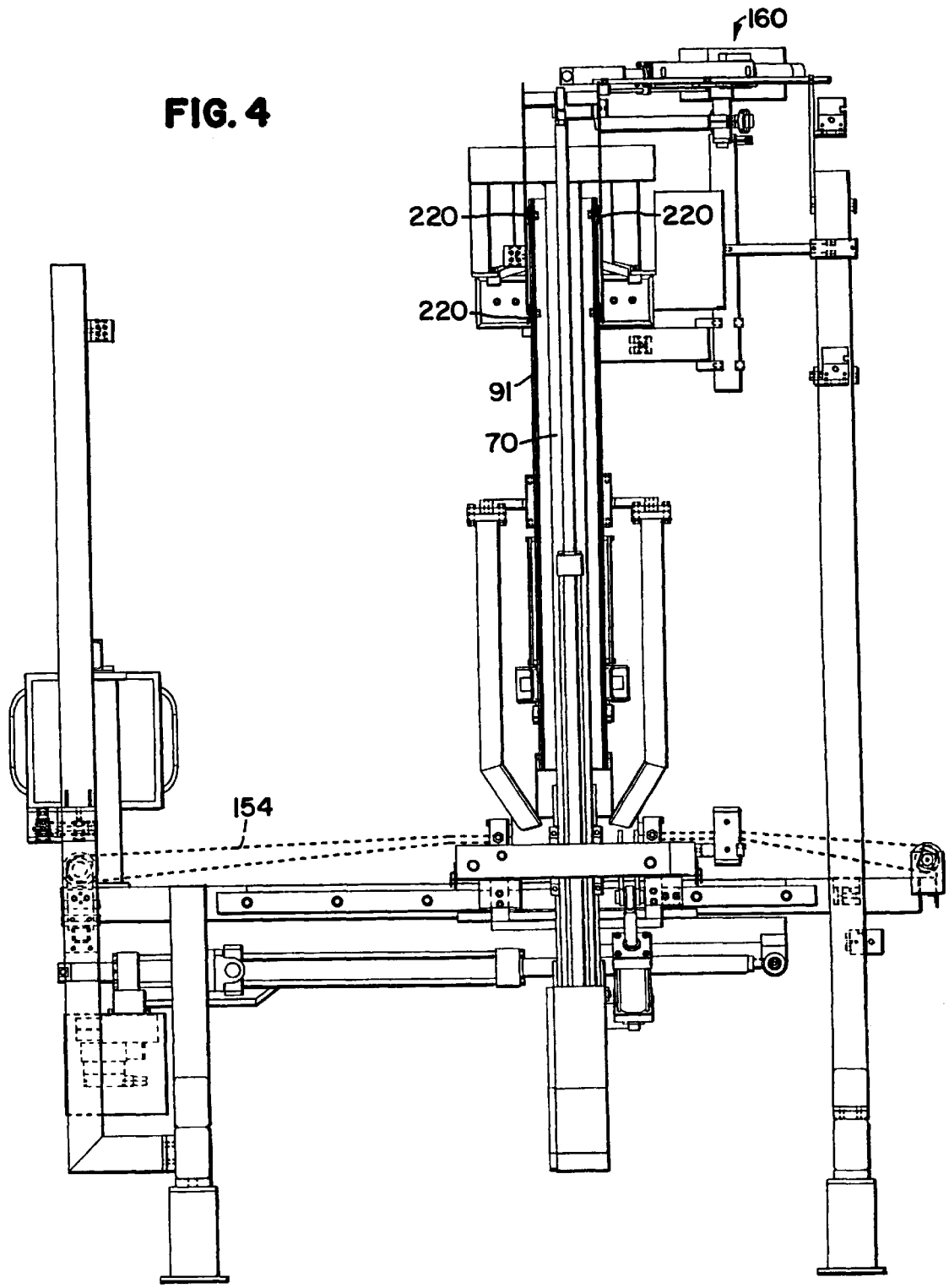
FIG. 4 is a front elevational view of the apparatus shown in FIG. 1.

The longitudinal axis of the conveyor 182 is parallel to that of the longitudinal axis of the carcass splitting apparatus 10. As viewed in FIG. 3, the hog carcass C would be entering the apparatus 10 approximately the middle of the belt 154. In viewing FIGS. 3 and 15, it can be seen that the trolley pusher arm assembly 160 is at an angle to the longitudinal axis of the carcass splitter 10. This allows for room for the trolley 186 to pass between the trolley pusher arm assembly 160 and the saw head assembly 90. The trolley engaging surface 181 is spring-loaded and rides on the guide rail 184. As viewed in FIG. 12, the trolley engaging surface 181 would be on the far side, or hidden side, of guide rail 184. The trolley wheel 186 is moved along the guide rail 184 and urges the trolley engaging surface 181 away from the guide rail 184. Then, as the trolley wheel 186 continues, the trolley engaging surface 181 snaps back behind the trolley wheel 186. There is a proximity switch located in the head of the trolley engaging surface 181 and this signifies to the apparatus that a hog carcass is available for splitting. At this time, the saw carriage mast and spine centering arm assembly 120 are positioned so as to be tilted backwards out of the way of the carcass C. Further, the carriage assembly 40 is positioned in its home position, or that position which is farthest upstream. Then, it is necessary for the carriage assembly 40 to accelerate to the speed of the chain 191. In fact, it is necessary that the speed be increased faster than the chain 191 so that control of the trolley wheel 186 is taken over by the carcass splitting apparatus 10. This is accomplished by the hydraulic cylinder 51 retracting to move the carriage assembly 40 downstream. At the same time, the hydraulic cylinder 165 is extended causing the leading edge 164a to contact the trolley wheel 186. The trolley pusher arm assembly 160 is moving along with the carriage assembly 40 as it is secured thereto. However, since the carriage assembly 40 is now going faster than the chain 191, the movement of the trolley wheel 186 is controlled by the movement of the carcass splitting apparatus 10 as the trolley wheel 186 is being pushed by the leading edge 164a. The transducers attach to the hydraulic cylinders 51 and 165 provide precise feedback as to their location and therefore the speed of the carriage assembly 40 and position can be precisely monitored. Suitable software and computer hardware to monitor and control is known.

Once the carriage and probe are coming up to speed, it is necessary that the hog carcass be centered prior to being split. It is important that the hog be lined up vertically. First, the pneumatic cylinder 132 is actuated to tilt the spine centering arm assembly towards the hog carcass C. The rollers 121 and 122 are pushed forward and as they do they center the spine as a roller is on each side of the spine. Then, the pneumatic cylinder 152 is actuated, moving the rack 153 to cause the shoulder engaging members 143 to close and grasp the hog carcass C proximate the shoulders. Then the tilt tube assembly 70 is tipped forward toward the hog carcass C. This brings the nose section 107 in to position in the cavity 112 and aligns the hams of the hog carcass C. Further, as the tilt tube assembly 70 is moved forward, the plow assembly 102 enters between the open hog carcass. The tilting is caused by movement of the extending rod 76 of the hydraulic cylinder 75, whose position is monitored by the transducer 80.

Then, with everything locked in alignment, the saw head assembly 90 begins moving down the track 91 by movement of the hydraulic cylinder 96, whose position is again monitored by the transducer 99. The velocity profile of the saw assembly 90, as it moves downward, can be controlled as typically the carcass is able to be split faster in the flank section and slower through the shoulder section. As the saw head assembly approaches the shoulder flap assembly 140 on the way downward the shoulder flap assembly 140 is opened to allow the carcass to relax and for the carcass to be split more easily.

After the splitting of the carcass has been completed and the carriage 40 is returning to the home position, the trolley pusher arm assembly 160 necessarily moves with the carriage to the home position. This removes the trolley-engaging member 164 from the trolley and allows for the drive chain 191 to resume control of the trolley wheel 186.

Then, when the saw head assembly is at the bottom, the sequence is reversed. The tilt tube assembly is tilted back out away from the hog carcass C and the saw blade assembly 90 starts upward. After the saw blade assembly passes the spine centering arm assembly 120, they are in turn tilted backwards out of the way. Then, the carriage returns to the home position, which is moving from the down stream position to the upstream home position.

Then, when the apparatus 10 is in its home position, and before the next hog carcass C arrives, the apparatus 10 is sprayed with water to wash the apparatus 10. The apparatus 10 is constructed from stainless steel to make washing easier. As viewed in FIG. 1, when in the home position, the shroud 108 of the plow assembly 102 in connection with a second shroud 210 covers the saw blade so that it may be sprayed without spraying the hog carcasses C. At the same time, the spine centering arm assembly 120 is sprayed with water. Finally, the belt 154 is also sprayed.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for splitting an animal carcass longitudinally through the backbone thereof, such as a hog carcass, as the carcass is suspended by a suspension mechanism from a rail on an overhead conveyor, the suspension mechanism being moveable on the rail and driven by the conveyor, the apparatus comprising:

(a) a frame having a longitudinal axis generally parallel to an overhead conveyor;

(b) a carriage assembly moveable along the longitudinal axis of the frame;

(c) a driving mechanism for moving the carriage assembly along the frame;

(d) a saw operatively connected to the carriage for generally vertical movement to split the carcass;

(e) a suspension member pusher operatively connected to the carriage assembly, the pusher comprising:

(i) a hydraulic cylinder having an extendable rod; and (ii) a probe surface operatively connected to the rod, wherein when the probe moves from a retracted position to an extended position, the probe surface engages the suspension mechanism and the probe surface, instead of the conveyor, controls movement along the rail as the driving mechanism moves the carriage assembly along the longitudinal axis.

2. An apparatus for splitting an animal carcass longitudinally through the backbone thereof, such as a hog carcass, as the carcass is suspended by a suspension mechanism from a rail on an overhead conveyor, the suspension mechanism being moveable on the rail and driven by the conveyor, the apparatus comprising:

(a) a frame having a longitudinal axis generally parallel to an overhead conveyor;

(b) a carriage assembly moveable along the longitudinal axis of the frame, the carriage having a first section on a first side of the longitudinal axis and a second section on a second side of the longitudinal axis;

(c) a driving mechanism for moving the carriage along the frame;

(d) a first hydraulic cylinder having an extendable rod, the cylinder operatively connected to the frame and the rod operatively connected to the carriage assembly, a first transducer operatively connected to the rod;

(e) a saw carriage mast pivotally mounted to the first section of the carriage for movement to the second section;

(f) a second hydraulic cylinder having an extendable rod, the cylinder operatively connected to the frame and the rod operatively connected to the saw carriage mast, a second transducer operatively connected to the rod;

(g) a saw moveable vertically on the saw carriage mast; and (h) a third hydraulic cylinder having an extendable rod, the cylinder operatively connected to the frame and the rod operatively connected to the saw, a third transducer operatively connected to the rod, wherein the position of each extendable rod is able to be monitored and more precisely controlled.

3. The apparatus of claim 2, further comprising:

(a) a suspension member pusher operatively connected to the carriage assembly, wherein the suspension member pusher moves with the carriage assembly; and (b) the pusher having a fourth hydraulic cylinder having an extendable rod operatively connected to a probe surface and a fourth transducer operatively connected to the rod, wherein when the probe moves from a retracted position to an extended position, the probe engages the suspension member and the probe surface, instead of the conveyor, controls movement along the rail as the driving mechanism moves the carriage assembly along the longitudinal axis.

4. The apparatus of claim 2, further comprising a spine centering assembly, the spine locator assembly comprising:

(a) first and second arms having first ends pivotally mounted to the first section of the carriage for movement toward the second section;

(b) a fifth hydraulic cylinder having an extendable arm, the extendable arm for pivoting the first and second arms; and (c) first and second spine centering devices operatively connected to second ends of the first and second arms, the centering devices spaced apart at a distance greater than a width of a backbone, wherein when the arms are pivoted to an extended position, the backbone is centered between the spine centering devices.

5. The apparatus of claim 2, further comprising a ham centering mechanism, the ham centering mechanism comprising:

(a) a mast having a first end secured to the second section of the carriage frame and the mast having a second end;

(b) a socket positioned proximate the second end of the mast, the socket having a receiving cavity;

(c) the saw carriage mast having a first end pivotally mounted to the carriage and the saw carriage mast a second end; and (d) a mating member operatively connected to the second end of the saw carriage mast, wherein when the saw carriage mast is pivoted from its position on the first section toward the second section, the mating member is positioned in the socket, thereby centering the hams of the carcass.

6. The apparatus of claim 5, further comprising a plow assembly operatively connected to the second end of the saw carriage mast, the plow assembly having a generally V-shape to separate the hams as the saw carriage masts pivots.

7. The apparatus of claim 2, further comprising a shoulder centering mechanism, the shoulder centering mechanism comprising:

(a) first and second plates having first ends rotatably mounted about a vertical axis to the carriage frame mast, and second ends rotatable between a disengaged and an engaged positions;

(b) a pinion gear operatively connected to each plate; and (c) a rack positioned between the pinion gears, wherein movement of the rack causes both plates to move between the disengaged and engaged positions.

8. The apparatus of claim 2, further comprising:

(a) first and second rollers mounted to the frame;

(b) a conveyor belt rotatable around the rollers; and (c) a clamp operatively connected to the carriage assembly, the clamp moveable between an open and closed position, wherein the belt is rotatable around the rollers when the clamp is closed and the carriage assembly moves.

9. The apparatus of claim 8, wherein the clamp has an upper opening and a lower opening and the belt has an upper member positioned in the upper opening and a lower member positioned in the lower opening, wherein when the carriage assembly is moved in a first direction the upper opening is closed and when the carriage assembly moves in a second, opposite direction, the lower opening is closed.

10. The apparatus of claim 2, further comprising a restraining mechanism, the restraining mechanism comprising:

(a) first and second pulleys, the pulleys secured in position under an overhead conveyor carrying an animal carcass;

(b) a belt positioned around the pulleys;

(c) the belt driven at a speed equal to the overhead conveyor; and (d) the pulleys positioned so that the belt contracts the carcass proximate the first pulley and gradually moves away from the carcass and proximate the second pulley the belt is not in contact with the carcass, wherein oscillating movements of the carcass are minimized due to contact with the belt.

11. The apparatus of claim 10, further comprising a rotatable shaft having a first end operatively connected to one of the pulleys and a second end operatively connected to a drive wheel, the drive wheel having engagement teeth that engage a drive chain of the conveyor, wherein the drive chain rotates the drive wheel, thereby rotating the shaft and the pulley so that the belt moves at a speed equal to that of the conveyor.

12. A method of splitting an animal carcass longitudinally through the backbone thereof, such as a hog carcass, comprising:

(a) suspending a carcass from a suspension member, the suspension member being moveable on a rail and driven by an engaging member of the conveyor;

(b) moving the suspension member on the rail away from the engaging member;

(c) controlling movement of the suspension member on the rail by a carcass splitting machine while the carcass is being split; and (d) releasing control of the suspension member back to the engaging member, wherein variable movement of the conveyor is eliminated during actual splitting of the carcass by having the movement of suspension member controlled by the carcass splitter.

* * * * *